(12) United States Patent
Maricevic

(10) Patent No.: US 8,515,281 B2
(45) Date of Patent: Aug. 20, 2013

(54) NODE SEGMENTATION

(75) Inventor: Zoran Maricevic, West Hartford, CT (US)

(73) Assignee: Arris Enterprises, Inc., Suwanee, GA (US)

( * ) Notice: Subject to any disclaimer, the term of this patent is extended or adjusted under 35 U.S.C. 154(b) by 344 days.

(21) Appl. No.: 12/906,612

(22) Filed: Oct. 18, 2010

(65) Prior Publication Data

US 2012/0093511 A1    Apr. 19, 2012

(51) Int. Cl.
*H04J 14/00* (2006.01)
*H04J 14/02* (2006.01)

(52) U.S. Cl.
CPC ................ *H04J 14/0282* (2013.01)
USPC ................ 398/66; 398/68; 398/71

(58) Field of Classification Search
USPC ................................ 398/66–72, 76
See application file for complete search history.

(56) References Cited

U.S. PATENT DOCUMENTS

| 6,738,540 | B2 * | 5/2004 | Marom | 385/17 |
| 2004/0028089 | A1 * | 2/2004 | Shake et al. | 370/542 |
| 2011/0280256 | A1 * | 11/2011 | Salinger | 370/419 |
| 2012/0075997 | A1 * | 3/2012 | Salinger et al. | 370/236 |

* cited by examiner

*Primary Examiner* — Dalzid Singh
(74) *Attorney, Agent, or Firm* — Troy Van Aacken

(57) ABSTRACT

Methods and systems for providing flexible node segmentation are provided. For example, the system can be configured to delay node segmentation in the headend/hub even though the fiber node has been segmented. When a desire for node segmentation in the headend/hub arises, the receiver can be efficiently upgraded through the use of a control signal to provide a receiver output port to each sub-service area.

10 Claims, 6 Drawing Sheets

US 8,515,281 B2

NODE SEGMENTATION

TECHNICAL FIELD

This disclosure relates to node segmentation.

BACKGROUND

A DOCSIS system, such as the system 100 shown in FIG. 1, can be used to deliver high-definition digital entertainment and telecommunications such as video, voice, and high-speed Internet to subscribers over an existing cable television network. As shown in FIG. 1, traffic (e.g., data, video, and voice signal) is transferred over a cable network 130 between a headend/hub 110 and cable modems (CMs) 120, which are located at subscriber premises. The cable network 130 can take the form of an all-coax, all-fiber, or hybrid fiber/coax (HFC) network.

There is a need for efficient solutions to expand the capacity in the network 130 as more traffic is transmitted between the headend/hub 110 and CMs 120 due to, for example, an increase in the data rates demanded by CMs served by the network 130 and/or delivery of expanded services such as video-on-demand.

DETAILED DESCRIPTION

Various implementations of this disclosure use a control signal to efficiently upgrade a receiver to provide an additional receiver output port to sub-service groups of a service group that may have been previously segmented.

Figure 1:
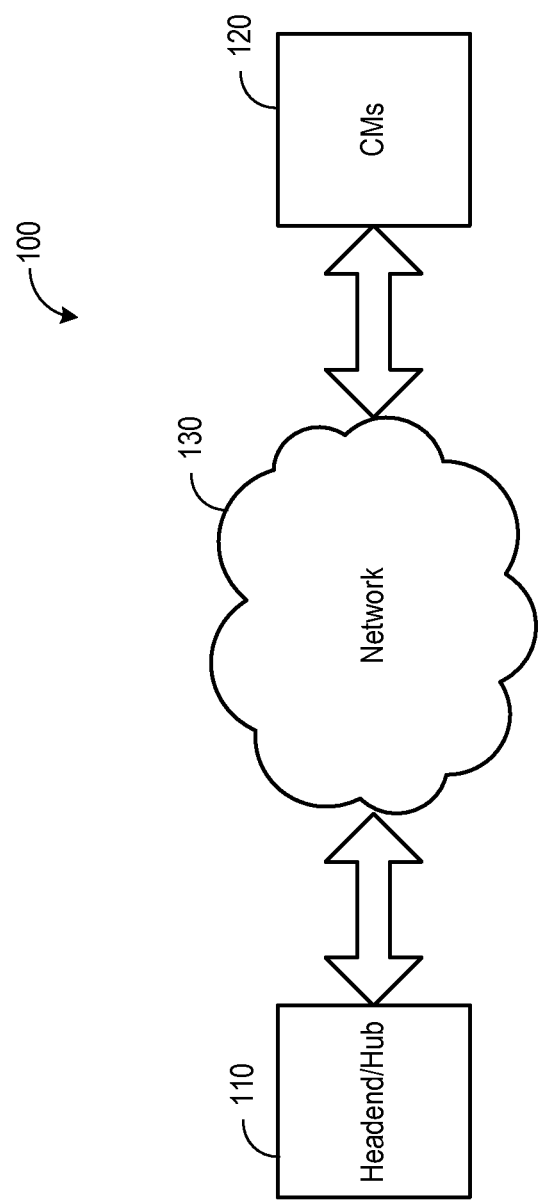
FIG. 1 illustrates a high level block diagram of a DOCSIS system for transferring traffic between a headend/hub and a CM over a network.
Figure 2:
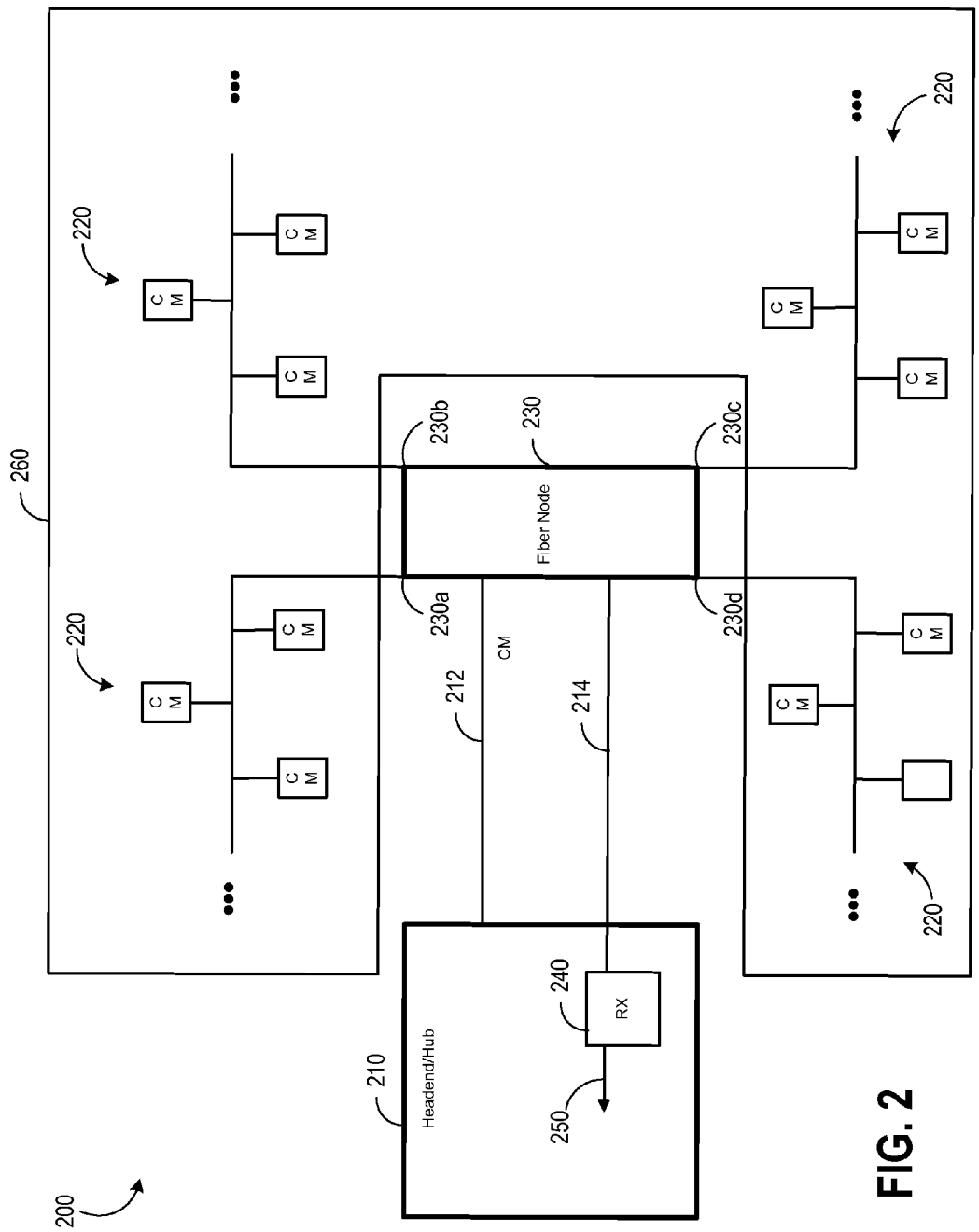
FIG. 2 illustrates an example DOCSIS system.

FIG. 2 illustrates an example DOCSIS system of FIG. 1. The DOCSIS system 200 of FIG. 2 uses two fibers 212, 214 for bi-directional communication between a headend/hub 210 and CMs 220. The headend/hub 210 transmits optical signals downstream to a fiber node 230 via a fiber 212. The fiber node 230 includes an optical receiver that converts the received optical signals to electrical signals that are transmitted to the CMs 220 that are served by the fiber node 230.

The example fiber node 230 of FIG. 2 has four RF ports 230a-d that interface with the CMs 220 via the coaxial section of the network. If the fiber node 230 can cover N homes passed, and if the fiber node 230 is balanced, then each port of the fiber node 230 would serve N/4 homes. For example, if the fiber node 230 covers 1000 homes passed, then if the fiber node 230 is balanced, each port would serve 250 homes.

The fiber node 230 also includes an upstream optical transmitter that combines the electrical signals received from the CMs 220 and converts the resulting electrical signals to optical signals and transmits the optical signals upstream to the headend/hub 210 via the fiber 214. In the headend/hub 210, a receiver 240 can operate to convert the upstream optical signals to electrical signals, which represents the electrically combined signals from the four ports of the fiber node 230. The receiver 240 can then outputs these electrical signals 250 to one of its RF output ports.

The capacity of fiber links in existing networks is or is becoming exhausted because of the increase in the data rates of CMs served by fiber nodes and the increase in the delivery of expanded services, which result in more traffic to be transmitted over the fibers. Node segmentation/splitting is a technique that can be used to expand the capacity of a network without using additional fiber.

Figure 3:
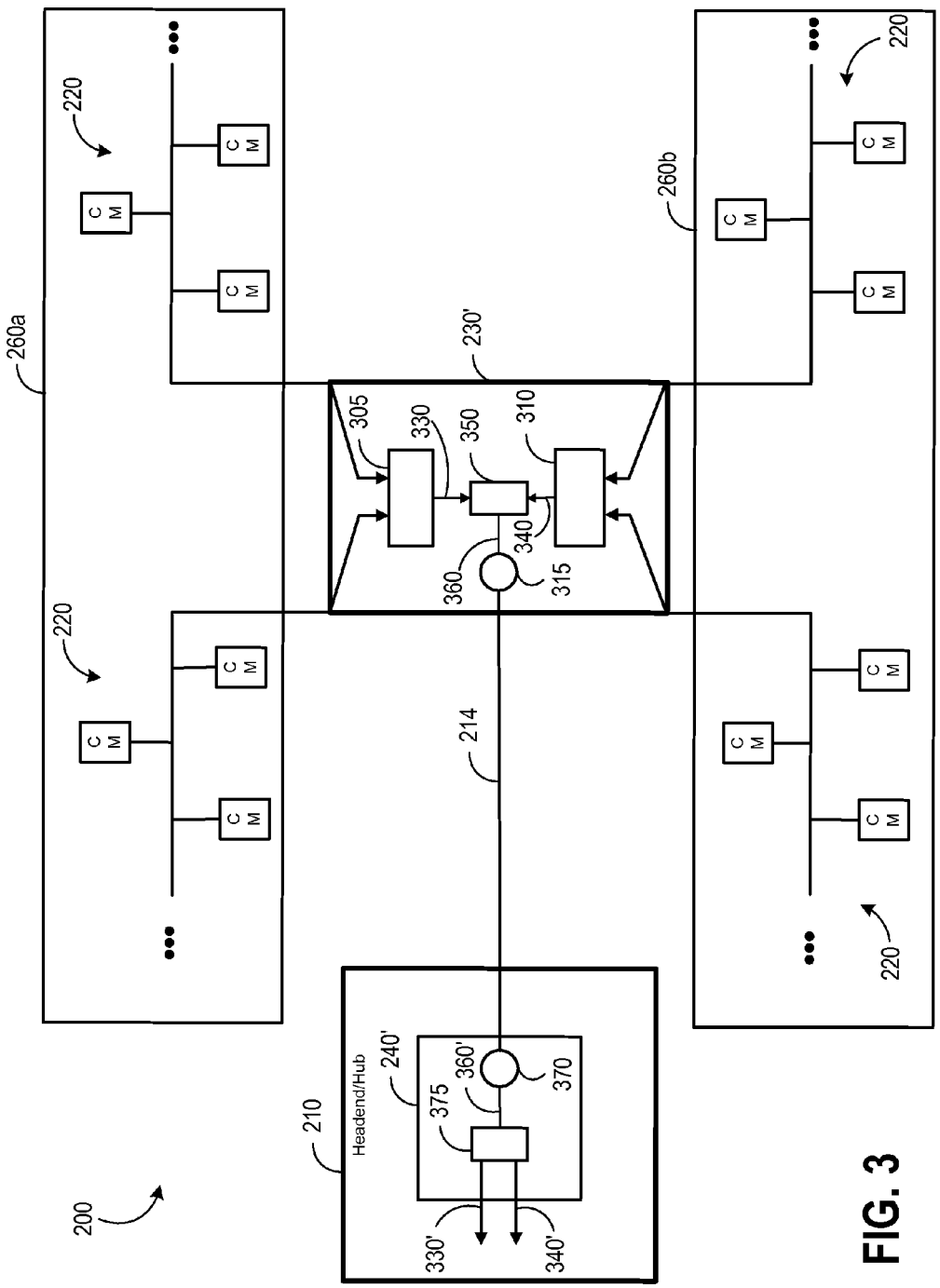
FIG. 3 illustrates an upstream or return path of an example DOCSIS system employing node segmentation/splitting.

Comparing FIGS. 2 and 3, the group of modems 220 served by fiber node 230 (i.e., service group 260) can be segmented or split into two or more sub-service groups using node segmentation/splitting. For example, as illustrated in FIG. 3, the service group 260 can be segmented into two sub-service groups 260a, 260b.

Additionally, the fiber node 230 can be segmented using node segmentation/splitting. That is, for example, in the fiber node 230', a combiner 305 can combine the electrical signals received from all the CMs in the sub-service group 260a and produce a resulting electrical signal 330. The combiner 310 also can combine the electrical signals received from all the CMs in the sub-service group 260b and produce a resulting electrical signal 340. The resulting electrical signals 330, 340 can be further processed (e.g., amplified, filtered, and digitized) and then multiplexed by a multiplexer 350 (in some implementations a time division multiplexer (TDM)), to produce a single multiplexed data stream 360. The multiplexed data stream 360 can be converted to an optical signal by optical transmitter 315 and transmitted upstream to headend/hub 310 via fiber 214. The downstream fiber 212 and corresponding circuitry in the headend/hub 310 and fiber node 230' are not shown for clarity.

At the headend/hub 210, in a receiver 240', a converter 370 can convert the optical signals to electrical signals 360' that represent the multiplexed data stream 360. The resulting multiplexed data stream 360' can be de-multiplexed by demultiplexer 375 into two electrical signals 330' and 340' representing electrical signal 330 and 340, respectively. The resulting electrical signals 330' and 340' can be further processed (e.g., by a digital-to-analog and amplifier) and then output to two separate RF output ports.

Thus, using node segmentation/splitting, the N cable modems in one service group (for example, service group 260) no longer have to all contend for the same upstream bandwidth. Instead, the service group can be segmented into multiple smaller service groups (for example, service group 260a, 260b) and bandwidth can be dedicated to each service group (for example, via TDM). As a result, the bandwidth that is allocated to a service group is shared by fewer CMs, thereby increasing the bandwidth per CM. Furthermore, each sub-service group has its own output at the receiver in the headend/hub.

From the fiber node perspective, the incremental cost to perform node segmentation at an initial system deployment can be minimal compared to the cost to upgrade a fiber node to perform node segmentation when the need arises. That is, the additional equipment cost and other costs to perform node segmentation at initial system deployment can be minimal compared to the labor cost (e.g., "truck roll cost") and other costs to upgrade a fiber node to perform node segmentation at some time in the future. Thus, from the fiber node perspective, during initial system deployment, it can be desirable to install the additional equipment needed to perform node segmentation to anticipate future capacity demands even if currently there is no demand for node segmentation.

However, from the headend/hub perspective, performing node segmentation at initial system deployment to anticipate future demands when currently there is no demand for node segmentation can be costly. As discussed above, node segmentation segments a service group into two or more sub-service groups where each sub-service group has its own output port at the receiver in the headend/hub. Since the costs of most headend processing equipment are driven by the number of ports used, it can be costly to underutilize a receiver RF output port. That is, if an entire service group can be serviced from one receiver output port, it can be desirable to service the entire service group from the one receiver output port. Thus, from the head/hub perspective, node segmentation may not be desirable until there is demand for it.

In view of the above, to efficiently meet the changing demands of a network, it can be desirable to perform node segmentation at initial system deployment (although there currently may be no need for node segmentation) to avoid the future cost to upgrade the system yet use only one receiver output port in the headend/hub per service group until the need for node segmentation actually arises. When the demand for node segmentation arises, it is further desirable to efficiently upgrade the receiver to provide a receiver output port to each sub-service area as with node segmentation.

Figure 4A:
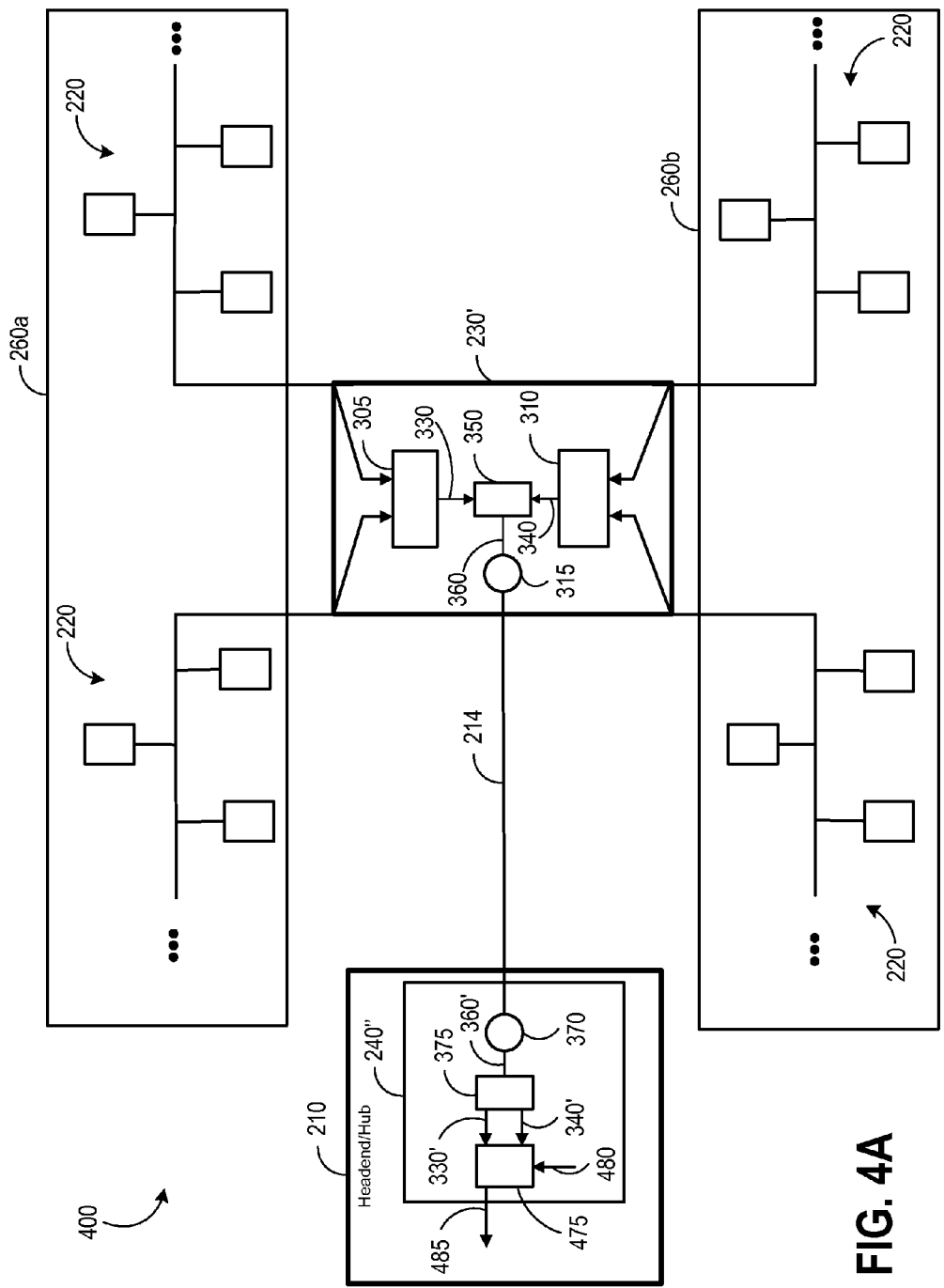
FIGS. 4A and 4B illustrate an example DOCSIS system that employs node segmentation in the fiber node at initial system deployment and includes the capability to provide one or more receiver output ports based on a control input.
Figure 4B:
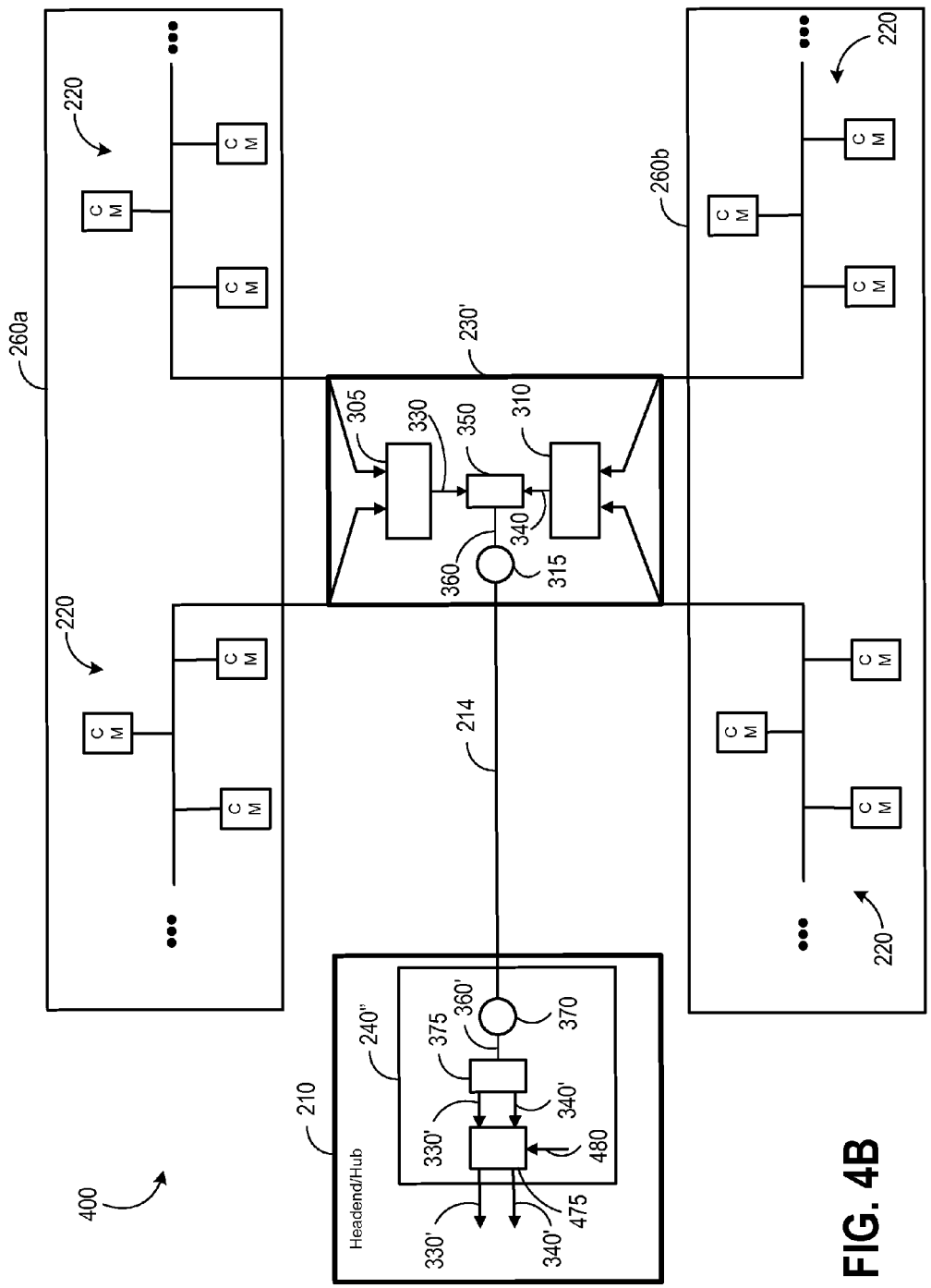

FIGS. 4A and 4B illustrate an example system 400 according to an example implementation that employs node segmentation in the fiber node at initial system deployment and includes the capability to provide one or more receiver output ports based on a control input. More specifically, the system 400 is similar to the system 300 but includes a modified receiver 240". The receiver 240" can include a processor 475 that receives two electrical signals 330' and 340' from a demultiplexer 375. Based on a control signal 480, the processor 475 can digitally sum the two electrical signals 330' and 340' and output the resulting signal 485 on one RF output port as shown in FIG. 4A, or alternatively, the processor 475 can output the two electrical signals 330' and 340' to two separate RF output ports, respectively, as shown in FIG. 4B.

Figure 5:
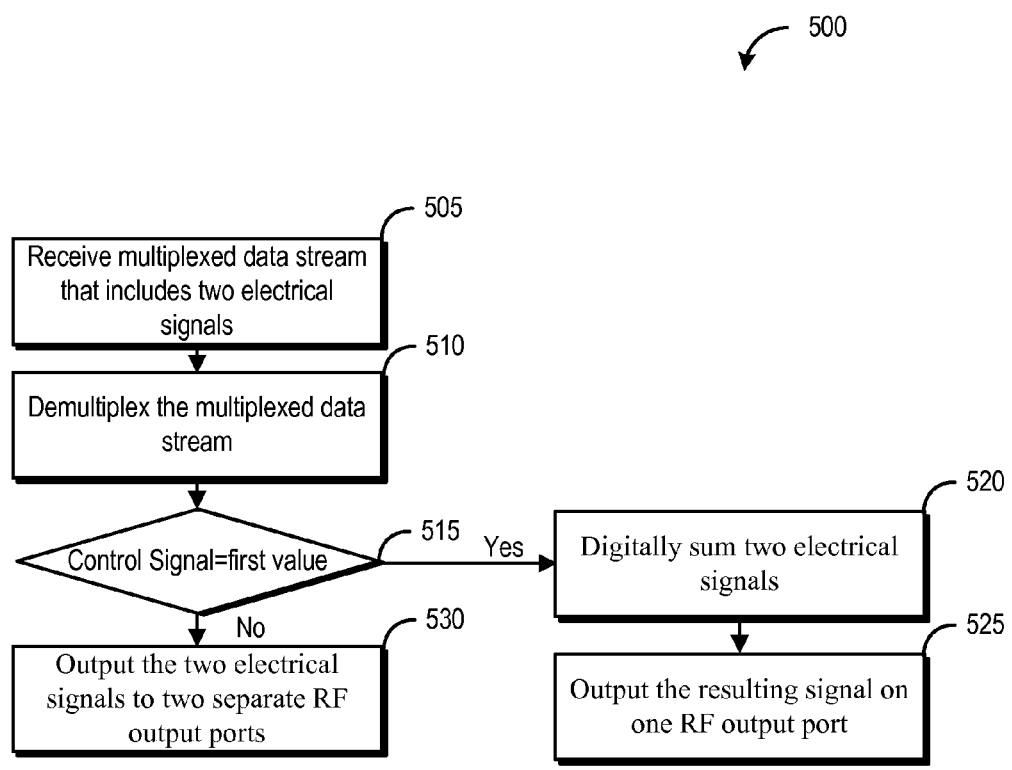
FIG. 5 illustrates an example method according to an example implementation of providing delayed node segmentation/splitting.

FIG. 5 illustrates an example method 500 according to an example implementation of providing delayed node segmentation in a headend/hub of a service group of modems served by a fiber node that has been segmented into two sub-service groups (e.g., sub-service group 260a, 260b) in the fiber node.

At stage 505, a receiver (e.g., the receiver 240") receives a multiplexed data stream (e.g., the multiplexed data stream 360') that includes two electrical signals representing traffic from the two service groups respectively (e.g., the electrical signals 330' and 340').

At stage 510, the receiver demultiplexes the multiplexed data stream into the two electrical signals.

At stage 515 the receiver determines whether a control signal is set to a first value or second value. If the control signal is set to a first value, then at stage 520, the receiver (e.g., via processor 475) digitally sums the two electrical signals and at stage 525 outputs the resulting signal (e.g., signal 485) on one RF output port. If the control signal is set to a second value, then at stage 530, the receiver outputs the two electrical signals to two separate RF output ports.

By use of a control signal, node segmentation in the headend/hub can be delayed while node segmentation in the fiber node can be performed at initial system deployment or at some other time (although there currently may be no need for node segmentation). That is, by use of a control signal, node segmentation in the fiber node can be performed at initial system deployment or at some other time to avoid the future cost to upgrade the system, yet only use one receiver output port in the headend/hub per service group until a desire for node segmentation actually arises. In some implementations, this is achieved by setting the control signal 480 to a first value. When the control signal is set to the first value, the receiver 240" digitally sums the two electrical signals 330' and 340' and outputs the resulting signal 485 on one RF output port. When node segmentation is desired, the receiver can be efficiently upgraded to provide a receiver output port to each sub-service group 260a, 260b as with node segmentation. In some implementations, this is achieved by setting the control signal 480 to a second value. When the control signal is set to the second value, the receiver outputs the two electrical signals 330' and 340' to two separate RF output ports.

In some implementations, the receiver may be configured to digitally sum the two electrical signals 330' and 340' and output the resulting signal 485 on one RF output port until instructed to output the two electrical signals 330' and 340' to two separate RF output ports. In some implementations, the receiver may be instructed to output the two electrical signals 330' and 340' to two separate RF output ports via a control signal that flips a register or control switch. In some implementations, a processor in the receiver (which in some implementation can be a field-programmable gate array (FPGA)) may be reconfigured to output the two electrical signals 330' and 340' to two separate RF output ports.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method of providing node segmentation where a service group of modems served by a fiber node is segmented into at least two sub-service groups, the method comprising:
   receiving a multiplexed data stream comprising at least two sub-service group signals wherein the first of the at least two sub-service group signals represents the combined electrical signals received from one or more cable modems in a first sub-service group of at least two sub-service groups and the second of the at least two sub-service group signals represents the combined electrical signals received from one or more cable modems in a second sub-service group of the at least two sub-service groups;
   demultiplexing the multiplexed data stream into at least two signals representing the at least two sub-service group signals; and
   based on a control signal, either digitally summing the at least two signals representing the at least two sub-service group signals and outputting the resulting signal on one RF output port or outputting at least two signals representing the at least two sub-service group signals to at least two separate RF output ports, wherein when the control signal is set to a first value, the at least two signals representing the at least two sub-service group signals are digitally summed and output on one RF output port.

2. The method of claim 1 wherein when the control signal is set to a second value, the at least two signals representing the at least two sub-service group signals are output to at least two separate RF output ports.

3. The method of claim 1 wherein the multiplexed data stream is a time division multiplexed data stream.

4. An apparatus for providing node segmentation where a service group of modems served by a fiber node is segmented into at least two sub-service groups, the apparatus comprising:
   a receiver comprising a demuliplexer, a processor, and at least two RF output ports wherein:
   the demultiplexer is configured to demultiplex a multiplexed data stream comprising at least two sub-service group signals wherein the first of the at least two sub-service group signals represents the combined electrical signals received from one or more cable modems in a first sub-service group of at least two sub-service groups and the second of the at least two sub-service group signals represents the combined electrical signals received from one or more cable modems in a second sub-service group of the at least two sub-service groups and
   the processor is configured to either digitally sum the at least two signals representing the at least two sub-service group signals and output the resulting signal on one of the at least two RF output ports or output at least two signals representing the at least two sub-service group signals to at least two separate RF output ports of the at least two RF output ports, wherein based on a control signal the processor is configured to digitally sum the at least two signals representing the at least two sub-service group signals and output the resulting signal on one of the at least two RF output ports when the control signal is set to a first value.

5. The apparatus of claim 4 wherein the processor is a field-programmable gate array (FPGA).

6. The apparatus of claim 4 wherein the processor is configured to, based on a control signal, either digitally sum the at least two signals representing the at least two sub-service group signals and output the resulting signal on one of the at least two RF output ports or output at least two signals representing the at least two sub-service group signals to at least two separate RF output ports of the at least two RF output ports.

7. The apparatus of claim 6 wherein the processor is configured to output at least two signals representing the at least two sub-service group signals to at least two separate RF output ports of the at least two RF output ports when the control signal is set to a second value.

8. The apparatus of claim 4 wherein the processor is configured to digitally sum the at least two signals representing the at least two sub-service group signals and output the resulting signal on one of the at least two RF output ports until instructed to output at least two signals representing the at least two sub-service group signals to at least two separate RF output ports of the at least two RF output ports.

9. The apparatus of claim 4 wherein the multiplexed data stream is a time division multiplexed data stream.

10. An apparatus for providing node segmentation where a service group of modems served by a fiber node is segmented into at least two sub-service groups, the apparatus comprising:
   means for receiving a multiplexed data stream comprising at least two sub-service group signals wherein the first of the at least two sub-service group signals represents the combined electrical signals received from one or more cable modems in a first sub-service group of at least two sub-service groups and the second of the at least two sub-service group signals represents the combined electrical signals received from one or more cable modems in a second sub-service group of the at least two sub-service groups;
   means for demultiplexing the multiplexed data stream into at least two signals representing the at least two sub-service group signals; and
   means for, based on a control signal, either digitally summing the at least two signals representing the at least two sub-service group signals and outputting the resulting signal on one RF output port or outputting at least two signals representing the at least two sub-service group signals to at least two separate RF output ports, wherein when the control signal is set to a first value, the at least two signals representing the at least two sub-service group signals are digitally summed and output on one RF output port.

* * * * *